United States Patent
Xu et al.

(10) Patent No.: US 10,045,378 B2
(45) Date of Patent: Aug. 7, 2018

(54) CHANNEL MONITORING METHOD AND DEVICE

(71) Applicant: CHINA ACADEMY OF TELECOMMUNICATIONS TECHNOLOGY, Beijing (CN)

(72) Inventors: Weijie Xu, Beijing (CN); Xueming Pan, Beijing (CN); Zukang Shen, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 15/524,256

(22) PCT Filed: Oct. 27, 2015

(86) PCT No.: PCT/CN2015/092914
§ 371 (c)(1),
(2) Date: May 3, 2017

(87) PCT Pub. No.: WO2016/070737
PCT Pub. Date: May 12, 2016

(65) Prior Publication Data
US 2017/0339719 A1 Nov. 23, 2017

(30) Foreign Application Priority Data

Nov. 5, 2014 (CN) .......................... 2014 1 0637246

(51) Int. Cl.
*H04W 74/08* (2009.01)
*H04W 72/04* (2009.01)
*H04W 16/14* (2009.01)

(52) U.S. Cl.
CPC ........ *H04W 74/0808* (2013.01); *H04W 16/14* (2013.01); *H04W 72/0446* (2013.01)

(58) Field of Classification Search
None
See application file for complete search history.

(56) References Cited

U.S. PATENT DOCUMENTS

2009/0129353 A1   5/2009   Ki et al.
2009/0180452 A1   7/2009   Kim et al.
(Continued)

FOREIGN PATENT DOCUMENTS

CN   102595449 A   7/2012
CN   102595569 A   7/2012
(Continued)

OTHER PUBLICATIONS

International Search Report for PCT/CN2015/092914 dated Jan. 20, 2016 and its English translation provided by WIPO.
(Continued)

*Primary Examiner* — Yaotang Wang
(74) *Attorney, Agent, or Firm* — Ladas & Parry, LLP

(57) ABSTRACT

The present disclosure provides a channel monitoring method and a channel monitoring device, to achieve the channel resource contention for an LTE system in the case that it operates on an unlicensed carrier. The channel monitoring method includes steps of: determining, by a device, a starting time point of CCA detection for monitoring a channel before data transmission and a required duration within which a CCA detection result indicates that the channel is clear; and monitoring, by the device, the channel on an unlicensed frequency band in accordance with the starting time point and the required duration.

17 Claims, 6 Drawing Sheets

(56) References Cited

U.S. PATENT DOCUMENTS

| | | |
|---|---|---|
| 2013/0051358 A1 | 2/2013 | Turtinen et al. |
| 2015/0110012 A1* | 4/2015 | Bhushan ........... H04W 74/0816 370/329 |
| 2015/0163805 A1* | 6/2015 | Cattoni ............. H04W 72/0453 370/329 |
| 2015/0327297 A1 | 11/2015 | Nilsson et al. |
| 2015/0334744 A1* | 11/2015 | Ji ..................... H04W 74/0816 370/336 |
| 2015/0373652 A1* | 12/2015 | Dabeer ............... H04W 52/246 455/522 |

FOREIGN PATENT DOCUMENTS

| | | |
|---|---|---|
| EP | 1662677 A1 | 5/2006 |
| WO | 2013/167557 A1 | 11/2013 |
| WO | 2014111309 A1 | 7/2014 |

OTHER PUBLICATIONS

Written Opinion of the International Search Authority for PCT/CN2015/092914 dated Jan. 20, 2016 and its English translation provided by WIPO.
From EPO Application No. 15856823.8, Supplementary European Search Report and Search Opinion dated Oct. 9, 2017.
From Korean Application No. 10-2017-7013303, Office Action dated Feb. 14, 2018 with machine English translation.

* cited by examiner

CHANNEL MONITORING METHOD AND DEVICE

CROSS-REFERENCE TO RELATED APPLICATIONS

This application is the U.S. national phase of PCT Application No. PCT/CN2015/092914 filed on Oct. 27, 2015, which claims the priority to the Chinese Patent Application No. 201410637246.X filed on Nov. 5, 2014 and entitled "channel monitoring method and device", the disclosures of which are incorporated herein by reference in their entireties.

TECHNICAL FIELD

The present disclosure relates to the field of communication technology, in particular to a channel monitoring method and a channel monitoring device.

BACKGROUND

As mobile data service volume continues to grow, spectrum resources has become more and more scarce, and for network deployment and service transmission, it is impossible to meet the requirements of the increased data service volume by merely using licensed spectrum resources. Hence, for a Long Term Evolution (LTE) system, the network development and the service transmission on unlicensed spectrum resources may be taken into consideration so as to improve the user experience and expand a network coverage, and this LTE system may be called as Unlicensed LTE (U-LTE or LTE-U for short). However, currently, there is no concrete scheme about how the LTE system can operate on the unlicensed spectrum resources.

A Listen Before Talk (LBT) principle on the unlicensed spectrum resources will be described as follows.

For the unlicensed spectrum resources, no specific application system has been planned, and they may be shared by various radio communication systems, such as Bluetooth and Wireless Fidelity (WiFi). The shared unlicensed spectrum resources may be used by various systems through resource preemption. Hence, coexistence between LTE-Us deployed by different operators or between the LTE-U and the radio communication system such as WiFi has become a research emphasis and difficulty. As required by the 3$^{rd}$ Generation Partnership Project (3GPP), the fair coexistence needs to be ensured between the LTE-U and the radio communication system such as WiFi, and a main carrier of a licensed frequency band may aid the implementation of an unlicensed frequency band as an auxiliary carrier. As a basic method for the LTE-U contention access, the LBT has accepted by almost all the companies.

The essence of the LBT technology is still a Carrier Sense Multiple Access/Conflict Avoidance (CSMA/CA) mechanism adopted by a 802.11 system. The WiFi system may preempt the resources on the unlicensed frequency band in the following ways. At first, it may monitor a channel, and in the case that an idle time of the channel reaches a Distributed Inter-Frame Space (DIFS), it may determine that the current channel is a clear channel. Then, sites which are waiting for access to the channel may be in a random backoff stage, so as to prevent the collision of the sites on the same resource. In addition, in order to ensure fairness, it is further speculated that the spectrum resource cannot be occupied by each site for a long time period. As a certain time period expires or a data transmission volume reaches an upper limit, the resource needs to be released, so that the other WiFi or LTE system can preempt the resource.

In the case that the LTE system operates on a carrier of the unlicensed frequency band, an LTE base station and a User Equipment (UE) also need to use the LBT mechanism for resource contention, so as to ensure that the spectrum resources can be shared fairly between the LTE system and any other device or system.

According to an European Standard, two methods for the LBT mechanism on the unlicensed frequency band will be described hereinafter.

As specified by European Telecommunication Standards Institute (ETSI), there are two modes for the LBT mechanism on the unlicensed 5 GHz frequency band, i.e., a Frame-based Equipment mode and a Load-based Equipment mode.

Referring to FIG. 1, in the Frame-based Equipment mode, a fixed frame occupation duration is provided, including a data transmission duration and an idle time period which is not smaller than 5% of the data transmission duration. Following a fixed frame, a Clear Channel Assessment (CCA) detection time period (at least 20 us) for detecting whether or not the channel is a clear channel may be provided. The channel may be used only in the case that an unlicensed device determines within the CCA detection time period, in an energy detection manner, that the channel is clear. For example, the unlicensed device may measure power of a signal received over the channel within the CCA time period, and in the case that received signal power over the channel is greater than a first power threshold, it may determine that the channel is busy; otherwise, it may determine that the channel is clear.

Referring to FIG. 2, in the Load-based Equipment mode, the data transmission duration is variable. Before the data transmission over an unlicensed channel, the unlicensed device needs to perform, in an energy detection manner, CCA detection on the channel once. In the case that the channel is clear, the unlicensed device may transmit data over the channel, and in the case that the channel is busy, the unlicensed device may detect the channel in a CCA-extended manner. During the CCA-extended detection, the unlicensed device needs to detect N CCA time periods within which the channel is clear, so as to determine that the channel is clear, and then, the unlicensed device may transmit the data over the channel. N is of a random value within the range of 1 to q, and q is of a value within the range of [4, 32].

Currently, there is no concrete scheme about how the LTE system can operate on the unlicensed frequency band. Also, for an unlicensed carrier, there is still no concrete scheme about the resource contention between the LTE base stations or UEs belonging to an identical operator.

Based on the LBT mechanism for the resource contention on the unlicensed carrier, in the case that the LTE system operates on the unlicensed carrier and each LTE base station/cell/UE generates its own CCA detection time period separately and participates, as an individual entity, in the resource contention on the unlicensed carrier, there may exist the following problems.

For a network side device, e.g., each LTE base station or cell of the operator, it may determine, through the following two steps, whether or not it can occupy the channel through contention after its own CCA detection time period expires.

Step 1: at first, the network side device needs to detect within a CCA detection window whether or not a signal has been transmitted (power detection), and in the case that the channel is clear (e.g., the power detected over the channel is smaller than a predetermined threshold), it may directly occupy the channel.

Step 2: in the case that there is signal transmitted over the channel, the network side device needs to further determine whether or not the signal transmitted over the channel is an LTE signal and whether or not this signal belongs to an identical operator. In the case that the signal belongs to the same operator, it may still occupy the channel (because the LTE system may support co-frequency networking). In the case that the signal belongs to a different operator, it may abandon the occupation of the channel. At this time, the network side device needs to detect or parse the signal (e.g., detect a Cell-specific Reference Signal (CRS) so as to acquire a cell identity (ID) and determine the operator to which the signal belongs). In order to detect and parse the signal, a certain time delay needs to be provided, e.g., at least a series of CRSs need to be detected, resulting in certain resource overhead and an increase in the processing complexity of the base station. In addition, due to signal interference between different base stations, it is impossible to ensure the detection performance, and thereby the LBT performance may be adversely affected.

At a terminal side, according to the conventional LTE mechanism, there is a fixed timing relationship between a Physical Downlink Control Channel (PDCCH) and an Uplink-Granted Physical Uplink Shared Channel (PUSCH) of the LTE system, and usually the PDCCH may precede the PUSCH by K subframes (K>=4). However, based on the contention mechanism on the unlicensed carrier, the UE needs to perform uplink channel resource contention before the transmission of the PUSCH, and it means that the base station may not determine, in the case that the base station schedules the PDCCH for the UE, whether or not the UE can acquire, during the transmission of the PUSCH, a UL resource after K subframes through contention. For example, the scheduled UE needs to occupy a channel through contention with a device of the other unlicensed system, and occupy a UL channel through contention with the other LTE UE (within an identical cell or neighboring cell) on an identical carrier. Hence, it is impossible to support multi-user scheduling or Multi-User Multi-Input Multi-Output (MU-MIMO) features. Due to the above-mentioned problems, the system efficiency may be degraded significantly.

In a word, currently there is no solution about the channel resource contention for the LTE system in the case that it operates on the unlicensed carrier.

SUMMARY

An object of the present disclosure is to provide a channel monitoring method and a channel monitoring device, so as to achieve the channel resource contention for the LTE system in the case that it operates on the unlicensed carrier.

In one aspect, the present disclosure provides in some embodiments a channel monitoring method, including steps of: determining, by a device, a starting time point of CCA detection for monitoring a channel before data transmission and a required duration within which a CCA detection result indicates that the channel is clear; and monitoring, by the device, the channel on an unlicensed frequency band in accordance with the starting time point and the required duration.

According to the channel monitoring method in the embodiments of the present disclosure, the device may monitor the channel on the unlicensed frequency band in accordance with the starting time point of the CCA detection for monitoring the channel before the data transmission and the required duration within which the CCA detection result indicates that the channel is clear, so as to achieve the channel resource contention for an LTE system in the case that it operates on the unlicensed carrier.

In a possible embodiment of the present disclosure, the step of determining, by the device, the starting time point of the CCA detection for monitoring the channel before the data transmission includes: determining, by the device, the starting time point of the CCA detection for monitoring the channel before the data transmission in accordance with a maximum data transmission duration and a previous CCA contention window, a length of the previous CCA contention window being a previous required duration within which the CCA detection result indicates that the channel is clear; or determining, by the device, the starting time point of the CCA detection for monitoring the channel before the data transmission in accordance with a definition about a starting time point of the CCA detection in a predetermined radio frame structure.

In a possible embodiment of the present disclosure, the step of determining, by the device, the required duration within which the CCA detection result indicates that the channel is clear includes: acquiring, by the device, the required duration within which the CCA detection result indicates that the channel is clear from a dedicated main control device; or determining, by the device, the required duration within which the CCA detection result indicates that the channel is clear in accordance with a predetermined rule.

According to the channel monitoring method in the embodiments of the present disclosure, each of the adjacent devices may determine, in an identical manner, the starting time point of the CCA detection for monitoring the channel before the data transmission and the required duration within which the CCA detection result indicates that the channel is clear, so as to ensure that, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

In a possible embodiment of the present disclosure, the step of determining, by the device, the required duration within which the CCA detection result indicates that the channel is clear in accordance with the predetermined rule includes: determining, by the device, the required duration within which the CCA detection result indicates that the channel is clear through one of the following formulae: $T\_CCA=mod(T/N)$ and $T\_CCA=mod(T*PLMN/N)$, where $T\_CCA$ represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

In a possible embodiment of the present disclosure, prior to determining, by the device, the starting time point of the CCA detection for monitoring the channel before the data transmission and the required duration within which the CCA detection result indicates that the channel is clear, the channel monitoring method further includes measuring, by the device, a signal for an adjacent device. The step of determining, by the device, the starting time point of the CCA detection for monitoring the channel before the data transmission and the required duration within which the CCA detection result indicates that the channel is clear includes determining, by the device, the starting time point of the CCA detection for monitoring the channel before the data transmission and the required duration within which the CCA detection result indicates that the channel is clear in the case that a measurement result acquired through measuring the signal for the adjacent device meets a predetermined condition.

In a possible embodiment of the present disclosure, the step of measuring, by the device, the signal for the adjacent device includes measuring, by the device, power of the signal for the adjacent device. The step of determining, by the device, the starting time point of the CCA detection for monitoring the channel before the data transmission and the required duration within which the CCA detection result indicates that the channel is clear in the case that the measurement result acquired through measuring the signal for the adjacent device meets the predetermined condition includes: determining, by the device, the starting time point of the CCA detection for monitoring the channel before the data transmission and the required duration within which the CCA detection result indicates that the channel is clear in the case that the power of the signal for the adjacent device is greater than a predetermined threshold.

In a possible embodiment of the present disclosure, the device is a base station or a UE.

In a possible embodiment of the present disclosure, in the case that the device is a base station, the channel monitoring method further includes transmitting, by the base station, a notification carrying the required duration within which the CCA detection result indicates that the channel is clear to a UE.

In a possible embodiment of the present disclosure, the step of transmitting, by the base station, the notification to the UE includes transmitting, by the base station, the notification to the UE through PDCCH signaling.

In a possible embodiment of the present disclosure, in the case that the device is a base station, the channel monitoring method further includes: transmitting, by the base station, a notification carrying a specific parameter to a UE, the notification being used to indicate the UE to determine the required duration within which the CCA detection result indicate that the channel is clear in accordance with the specific parameter and the predetermined rule.

In a possible embodiment of the present disclosure, the notification further carries validation time information about the required duration within which the CCA detection result indicates that the channel is clear.

In a possible embodiment of the present disclosure, in the case that the device is a UE, the step of determining, by the device, the required duration within which the CCA detection result indicates that the channel is clear includes: receiving, by the UE, a notification from a base station, so as to acquire the required duration within which the CCA detection result indicates that the channel is clear carried in the notification.

In a possible embodiment of the present disclosure, the step of receiving, by the UE, the notification from the base station includes receiving, by the UE, the notification from the base station through PDCCH signaling.

In a possible embodiment of the present disclosure, in the case that the device is a UE, the step of determining, by the device, the required duration within which the CCA detection result indicates that the channel is clear includes: receiving, by the UE, a notification from a base station so as to acquire a specific parameter carried in the notification; and determining, by the UE, the required duration within which the CCA detection result indicates that the channel is clear in accordance with the specific parameter and the predetermined rule.

In a possible embodiment of the present disclosure, the channel monitoring method further includes acquiring, by the UE, validation time information about the required duration within which the CCA detection result indicates that the channel is clear carried in the notification. The step of monitoring, by the device, the channel on the unlicensed frequency band in accordance with the starting time point and the required duration includes monitoring, by the UE, the channel on the unlicensed frequency band in accordance with the starting time point, the required duration and the validation time information.

In another aspect, the present disclosure provides in some embodiments a channel monitoring device, including: a determination unit configured to determine a starting time point of CCA detection for monitoring a channel before data transmission and a required duration within which a CCA detection result indicates that the channel is clear; and a monitoring unit configured to monitor the channel on an unlicensed frequency band in accordance with the starting time point and the required duration.

According to the channel monitoring device in the embodiments of the present disclosure, the channel monitoring device may monitor the channel on the unlicensed frequency band in accordance with the starting time point of the CCA detection for monitoring the channel before the data transmission and the required duration within which the CCA detection result indicates that the channel is clear, so as to achieve the channel resource contention for an LTE system in the case that it operates on the unlicensed carrier.

In a possible embodiment of the present disclosure, in the case of determining the starting time point of the CCA detection for monitoring the channel before the data transmission, the determination unit is further configured to determine the starting time point of the CCA detection for monitoring the channel before the data transmission in accordance with a maximum data transmission duration and a previous CCA contention window, a length of the previous CCA contention window being a previous required duration within which the CCA detection result indicates that the channel is clear; or determine the starting time point of the CCA detection for monitoring the channel before the data transmission in accordance with a definition about a starting time point of the CCA detection in a predetermined radio frame structure.

In a possible embodiment of the present disclosure, in the case of determining the required duration within which the CCA detection result indicates that the channel is clear, the determination unit is further configured to acquire the required duration within which the CCA detection result indicates that the channel is clear from a dedicated main control device; or determine the required duration within which the CCA detection result indicates that the channel is clear in accordance with a predetermined rule.

According to the channel monitoring device in the embodiments of the present disclosure, each of the adjacent devices may determine, in an identical manner, the starting time point of the CCA detection for monitoring the channel before the data transmission and the required duration within which the CCA detection result indicates that the channel is clear, so as to ensure that, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

In a possible embodiment of the present disclosure, in the case of determining the required duration within which the CCA detection result indicates that the channel is clear in accordance with the predetermined rule, the determination unit is further configured to determine the required duration within which the CCA detection result indicates that the channel is clear through one of the following formulae: T_CCA=mod(T/N) and T_CCA=mod(T*PLMN/N), where T_CCA represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

In a possible embodiment of the present disclosure, the determination unit is further configured to, prior to determining the starting time point of the CCA detection for monitoring the channel before the data transmission and the required duration within which the CCA detection result indicates that the channel is clear, measure a signal for an adjacent device. In the case of determining the starting time point of the CCA detection for monitoring the channel before the data transmission and the required duration within which the CCA detection result indicates that the channel is clear, the determination unit is further configured to determine the starting time point of the CCA detection for monitoring the channel before the data transmission and the required duration within which the CCA detection result indicates that the channel is clear in the case that a measurement result acquired through measuring the signal for the adjacent device meets a predetermined condition.

In a possible embodiment of the present disclosure, in the case of measuring the signal for the adjacent device, the determination unit is further configured to measure power of the signal for the adjacent device. In the case of determining the starting time point of the CCA detection for monitoring the channel before the data transmission and the required duration within which the CCA detection result indicates that the channel is clear in the case that the measurement result acquired through measuring the signal for the adjacent device meets the predetermined condition, the determination unit is further configured to determine the starting time point of the CCA detection for monitoring the channel before the data transmission and the required duration within which the CCA detection result indicates that the channel is clear in the case that the power of the signal for the adjacent device is greater than a predetermined threshold.

In a possible embodiment of the present disclosure, the channel monitoring device is a base station or a UE.

In a possible embodiment of the present disclosure, in the case that the channel monitoring device is a base station, the determination unit is further configured to transmit a notification carrying the required duration within which the CCA detection result indicates that the channel is clear to a UE.

In a possible embodiment of the present disclosure, the determination unit is further configured to transmit the notification to the UE through PDCCH signaling.

In a possible embodiment of the present disclosure, in the case that the channel monitoring device is a base station, the determination unit is further configured to transmit a notification carrying a specific parameter to a UE, the notification being used to indicate the UE to determine the required duration within which the CCA detection result indicate that the channel is clear in accordance with the specific parameter and the predetermined rule.

In a possible embodiment of the present disclosure, the notification further carries validation time information about the required duration within which the CCA detection result indicates that the channel is clear.

In a possible embodiment of the present disclosure, in the case that the channel monitoring device is a UE and the determination unit determines the required duration within which the CCA detection result indicates that the channel is clear, the determination unit is further configured to receive a notification from a base station, so as to acquire the required duration within which the CCA detection result indicates that the channel is clear carried in the notification.

In a possible embodiment of the present disclosure, the determination unit is further configured to receive the notification from the base station through PDCCH signaling.

In a possible embodiment of the present disclosure, in the case that the channel monitoring device is a UE and the determination unit determines the required duration within which the CCA detection result indicates that the channel is clear, the determination unit is further configured to: receive a notification from a base station so as to acquire a specific parameter carried in the notification; and determine the required duration within which the CCA detection result indicates that the channel is clear in accordance with the specific parameter and the predetermined rule.

In a possible embodiment of the present disclosure, the determination unit is further configured to acquire validation time information about the required duration within which the CCA detection result indicates that the channel is clear carried in the notification. The monitoring unit is further configured to monitor the channel on the unlicensed frequency band in accordance with the starting time point, the required duration and the validation time information.

In yet another aspect, the present disclosure provides in some embodiments a network side device, including a processor and a memory. The processor is configured to read a program stored in the memory, so as to: determine a starting time point of CCA detection for monitoring a channel before data transmission and a required duration within which a CCA detection result indicates that the channel is clear; and monitor the channel on an unlicensed frequency band in accordance with the starting time point and the required duration.

In still yet another aspect, the present disclosure provides in some embodiments a terminal side device including a processor and a memory. The processor is configured to read a program stored in the memory, so as to: determine a starting time point of CCA detection for monitoring a channel before data transmission and a required duration within which a CCA detection result indicates that the channel is clear; and monitor the channel on an unlicensed frequency band in accordance with the starting time point and the required duration.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

An object of the present disclosure is to provide a channel monitoring method and a channel monitoring device, so as to achieve the channel resource contention for an LTE system in the case that it operates on an unlicensed carrier.

According to the embodiments of the present disclosure, each of adjacent devices may determine, in an identical manner, a starting time point of CCA detection for monitoring a channel before data transmission and a required duration within which a CCA detection result indicates that the channel is clear, so as to ensure that, on the carrier of an unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

Figure 3:
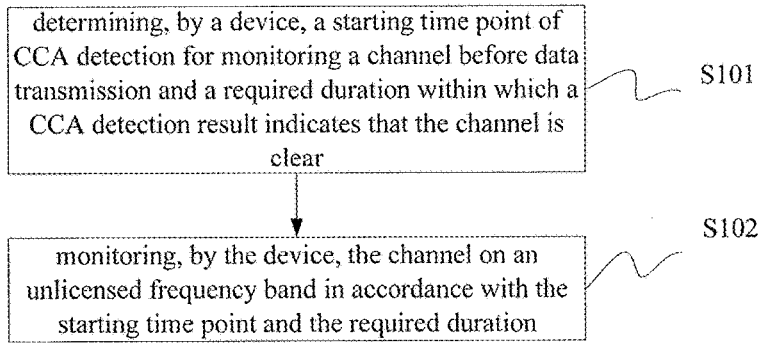
FIG. 3 is a flow chart of a channel monitoring method according to one embodiment of the present disclosure.

The present disclosure provides in some embodiments a channel resource contention method for any device (e.g., a UE or a base station) in the case that a plurality of devices exists in an unlicensed frequency band, which, as shown in FIG. 3, includes: Step S101 of determining, by the device, a starting time point of CCA detection for monitoring a channel before data transmission and a required duration within which a CCA detection result indicates that the channel is clear; and Step S102 of monitoring, by the device, the channel on the unlicensed frequency band in accordance with the starting time point and the required duration determined in Step S101, and determining whether or not the channel is available in accordance with a monitoring result.

The step of determining, by the device, the starting time point of the CCA detection for monitoring the channel before the data transmission includes: (1) determining, by the device, the starting time point of the current CCA detection in accordance with a maximum data transmission duration (i.e., a predetermined maximum duration required for the data transmission) and a previous CCA contention window (to be specific, an end time point of the previous CCA detection); or (2) determining, by the device, the starting time point of the current CCA detection for monitoring the channel before the data transmission in accordance with a definition about a starting time point of the CCA detection in a predetermined radio frame structure. The starting time point of the CCA detection or the end time point of the CCA detection may be defined in the predetermined radio frame structure.

In the case that the end time point of the CCA detection has been defined in the predetermined radio frame structure, the device may determine the starting time point of the CCA detection in accordance with the end time point of the CCA detection and the required duration within which the CCA detection result indicates that the channel is clear. However, at this time, it is required to determine in advance the duration within which the CCA detection result indicates that the channel is clear.

Figure 1:
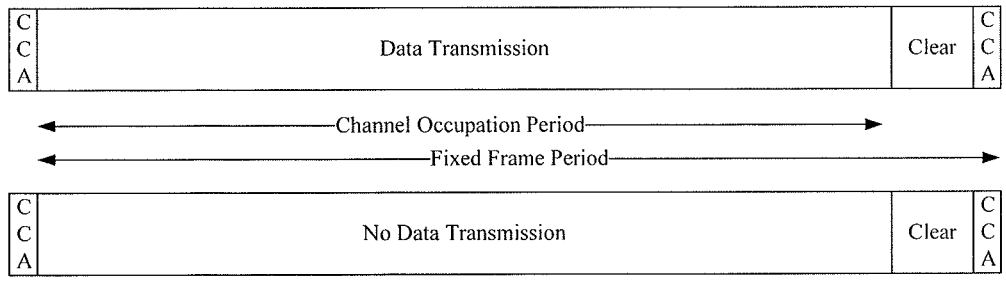
FIG. 1 is a schematic view showing a conventional Frame-based Equipment LBT scheme.
Figure 2:
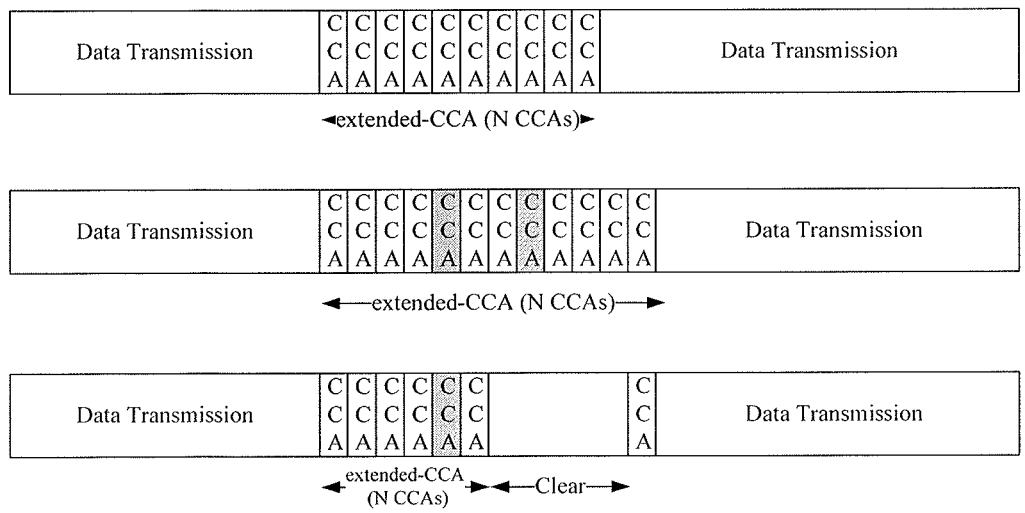
FIG. 2 is a schematic view showing a conventional Load-based Equipment LBT scheme.

The required duration within which the CCA detection result indicates that the channel is clear is different from an actual duration for performing the CCA detection in accordance with the required duration. For example, as shown in FIG. 2, presumed that the required duration within which the CCA detection result indicates that the channel is clear includes 10 (i.e., N=10) CCA detection time periods and a duration of each CCA detection time period is 20 us, the device may determine that the channel is available only in the case that the CCA detection results within the 10 CCA detection time periods indicate that the channel is clear. However, during the actual CCA detection, more than 10 CCA detection time periods may be adopted by the device. As shown in FIG. 2, during the CCA detection, the CCA detection results within 2 CCA detection time periods indicate that the channel is busy, so actually the CCA detection needs to be performed within 12 CCA detection time periods. In other words, during the actual CCA detection, the durations for performing the CCA detection by various devices in accordance with the required duration may be different from each other and greater than the required duration. However, the various devices may be provided with the same required duration within which the CCA detection result indicates that the channel is clear. Hence, according to the embodiments of the present disclosure, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

In addition, it should be appreciated that, in the embodiments of the present disclosure, the CCA detection may be performed to in an energy detection manner determine whether the channel is clear within a predetermined time period. For example, in the case that received signal power measured over the channel is a greater than a first power threshold within 20 us, the device may determine that the channel is busy, and otherwise, it may determine that the channel is clear.

In addition, in conjunction with FIG. 2, the required duration within which the CCA detection results indicates that the channel is clear determined by the device before the data transmission may be a duration of a continuous time period or a plurality of time periods.

The step of determining, by the device, the required duration (T_CCA) within which the CCA detection result indicates that the channel is clear may include one of the following two ways. In a first way, the device may acquire the required duration within which the CCA detection result indicates that the channel is clear from a dedicated main control device. This duration may be a specific value, e.g., 80 us, or a quantized value (e.g., 20 us may be taken as a unit, and a quantized value 4 may represent 80 us), or a random number N of the CCS detection time periods (20 us) within which the channel is detected to be clear in an LBT-extended CCA mode. The dedicated main control device may be, for example, a main control base station or any other main control node. In a second way, the device may determine the required duration within which the CCA detection result indicates that the channel is clear in accordance with a predetermined T_CCA generation rule in conjunction with a relevant input parameter (e.g., an absolute time, a maximum quantized T_CCA value, or a PLMN identifier of an operator).

In a possible embodiment of the present disclosure, the device may determine whether or not to adopt the channel monitoring method in accordance with a measurement result of a neighboring cell. For example, prior to determining, by the device, the starting time point of the CCA detection for monitoring the channel before the data transmission and the required duration within which the CCA detection result indicates that the channel is clear, the channel monitoring method further includes measuring, by the device, a signal for an adjacent device. Correspondingly, the step of determining, by the device, the starting time point of the CCA detection for monitoring the channel before the data transmission and the required duration within which the CCA detection result indicates that the channel is clear includes determining, by the device, the starting time point of the CCA detection for monitoring the channel before the data transmission and the required duration within which the CCA detection result indicates that the channel is clear in the case that a measurement result acquired through measuring the signal for the adjacent device meets a predetermined condition.

For example, in the case that an unlicensed LTE device has detected neighboring LTE devices which belong to an operator identical to the unlicensed LTE device and power of signals for the neighboring LTE devices is greater than a first threshold (Threshold 1), it means that there is a plurality of neighboring LTE devices, and the channel monitoring method in the embodiments of the present disclosure may be applied. In contrast, in the case that the unlicensed LTE device has detected neighboring LTE devices which belong to an operator identical to the unlicensed LTE device and the power of signals for these neighboring LTE devices is smaller than a second threshold (Threshold 2), or in the case that the unlicensed LTE device fails to detect any neighboring LTE devices which belong to an operator identical to the unlicensed LTE device, the channel monitoring method or a known LBT mechanism (where the unlicensed LTE device may independently select the starting time point of the CCA detection and independently generate, in accordance with the specification requirements, the required duration within which the CCA detection result indicates that the channel is clear before the data transmission) may be applied.

Threshold 1 and Threshold 2 may be identical to, or different from, each other. In the case that they are different from each other, the values thereof will not be particularly defined herein. In a possible embodiment of the present disclosure, Threshold 1 may be greater than Threshold 2.

More details will be given hereinafter in conjunction with several embodiments.

First Embodiment: The Device May Determine the Starting Time Point of the CCA Detection for Monitoring the Channel Before the Current Data Transmission in Accordance with a Maximum Channel Occupation Duration and a Previous CCA Contention Window A maximum transmission duration after every successful channel resource contention, i.e., the maximum channel occupation duration, may be set by the operator in accordance with the specification requirements on the relevant unlicensed frequency band. For example, the maximum channel occupation duration may be 10 ms.

In this embodiment, the starting time point of the current CCA detection may be determined by incrementing an end time point of the previous CCA contention window by one maximum channel occupation duration.

Figure 4:
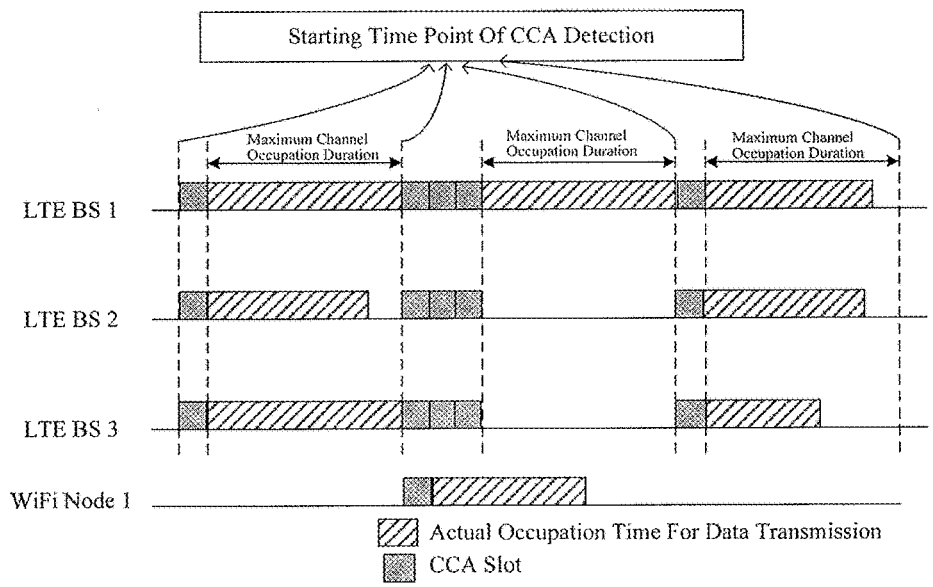
FIG. 4 is a schematic view showing the determination of a starting time point for CCA detection according to one embodiment of the present disclosure.

It should be appreciated that, the CCA contention windows may be different from each other, and each CCA contention window may consist of one or more CCA slots, as shown in FIG. 4. In terms of a time axis, a size of each CCA detection window for determining the starting time point of the CCA detection is variable and may be equal to the required duration, within which the CCA detection result indicates that the channel is clear, for the current CCA detection (rather than the actual duration within which the CCA detection result indicates that the channel is clear). In other words, the required duration within which the CCA detection result indicates that the channel is clear may be taken as the size of the current CCA contention window, so as to determine the starting time point of the next CCA detection.

Through the above-mentioned method, for the base station which has occupied the channel, even in the case that a transmission time of the base station is smaller than the maximum transmission duration, it may perform the CCA detection after the maximum data transmission duration has expired, as shown in FIG. 4. However, as a premise, the devices may be provided with an identical starting time point of the initial CCA detection, and for any newly-joined device, a synchronization procedure may be performed so as to enable its starting time point of the CCA detection to be identical to that of the previously-operated device. For example, the starting time points of the CCA detection for different devices may be synchronized in a backhaul synchronization manner.

As shown in FIG. 4, there are 3 LTE base stations (BSs) (LTE BS 1, LTE BS 2 and LTE BS 3) and 1 WiFi node (WiFi node 1). For each LTE base station, the starting time point of the current CCA detection may be determined by incrementing an end time point of the previous CCA detection by one maximum data transmission duration.

It should be appreciated that, the starting time point of the current CCA detection is not directly associated with the actual duration of the previous data transmission. Hence, for every data transmission, the device may determine the transmission duration in accordance with an actual service load, and it is unnecessary for the device to transmit data within the entire maximum data transmission duration. In FIG. 4, the LTE BS2 and the LTE BS3 are located adjacent to the WiFi node 1, so before the data transmission for the second time, no data transmission may be performed by the two base stations due to the interference from the WiFi node 1. However, the LTE BS1 is located far away from the WiFi node 1, so the normal data transmission may not be interference with the WiFi node 1. Slashed portions in FIG. 4 represent signal frames, i.e., the actual durations for the data transmission.

Second Embodiment: The Device May Determine the Starting Time Point of the CCA Detection in Accordance with a Radio Frame Structure In this embodiment, in the case of operating at the unlicensed frequency band, the device may follow a predefined or preconfigured radio frame structure including a definition about the starting time point of the CCA detection.

Figure 5A:
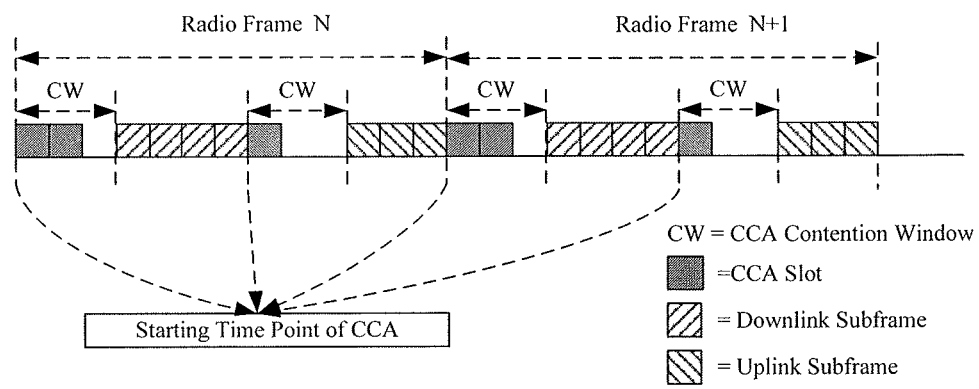
FIG. 5a is another schematic view showing the determination of the starting time point for the CCA detection according to one embodiment of the present disclosure.

FIG. 5a shows a mode for determining the starting time point of the CCA detection, i.e., the starting time point of the CCA detection may be predefined in the radio frame structure. For example, before a data transmission subframe (for an LTE system, the data transmission subframe may be a downlink or an uplink subframe), the radio frame structure may be configured with a CCA contention window (CW), a starting time point of which may be taken as the starting time point of the CCA detection.

It should be appreciated that, the mode for determining the starting time point of the CCA detection as shown in FIG. 5a may result in such a consequence that there is a certain time gap between the time where the channel has be acquired in accordance with the CCA detection and the data transmission subframe. In order to prevent the channel from being preempted by the other device within this time gap, the device that has acquired the channel may transmit some occupation signals or transmit the data in advance. For example, in the case that the time gap is not big enough to carry a complete subframe, the data may be transmitted in the form of an incomplete subframe.

Figure 5B:
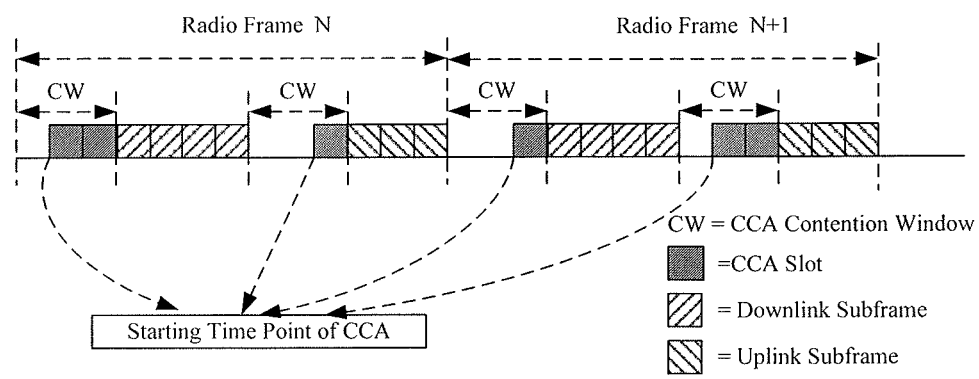
FIG. 5b is yet another schematic view showing the determination of the starting time point for the CCA detection according to one embodiment of the present disclosure.

FIG. 5b shows another mode for determining the starting time point of the CCA detection. To be specific, a CCA contention window may be configured in a radio subframe, and an end time point of the CCA contention window may be taken as the end time point of the CCA detection. Then, the device may calculate the starting time point of the CCA detection in accordance with the required duration which has been generated or acquired in advance and within which the CCA detection result indicates that the channel is clear before the current data transmission.

Figure 5C:
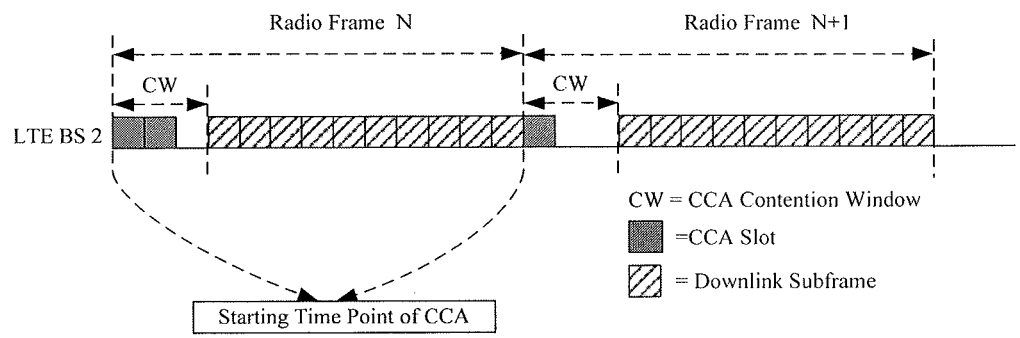
FIG. 5c is still yet another schematic view showing the determination of the starting time point for the CCA detection according to one embodiment of the present disclosure.
Figure 5D:
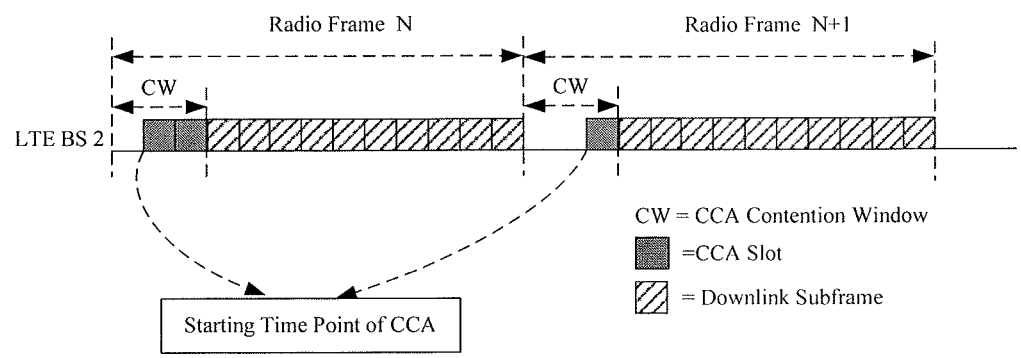
FIG. 5d is still yet another schematic view showing the determination of the starting time point for the CCA detection according to one embodiment of the present disclosure.

In the case that the radio frame merely includes downlink subframes, the two modes for determining the starting time point of the CCA detection in FIGS. 5a and 5b may correspond to those in FIGS. 5c and 5d respectively, which will not be particularly defined herein.

Through the methods mentioned in the first and second embodiments, a plurality of unlicensed devices which belong to an identical operator may be provided with the same starting time point of the CCA detection. However, in order to prevent the mutual interference among these unlicensed devices, the times of the successful CCA detection for these unlicensed devices also need to be identical to each other. Hence, the required duration within which the CCA detection result indicates that the channel is clear before the data transmission needs to be acquired in conjunction with the following embodiments.

Third Embodiment: A Plurality of LTE Base Stations or UEs May Acquire the Required Duration within which the CCA Detection Result Indicates that the Channel is Clear from a Main Control Base Station or a Main Control Node For convenience, the duration within which the CCA detection result indicates that the channel is clear may be represented by T_CCA. The T_CCA may be generated in advance by the main control base station or main control node (e.g., through a unit which is dedicated to generate the T_CCA). It may be a specific value, a quantized value, or a random number N of the CCA detection time periods within which the CCA detection result indicates that the channel is clear in an LBT-extended CCA manner.

Figure 6:
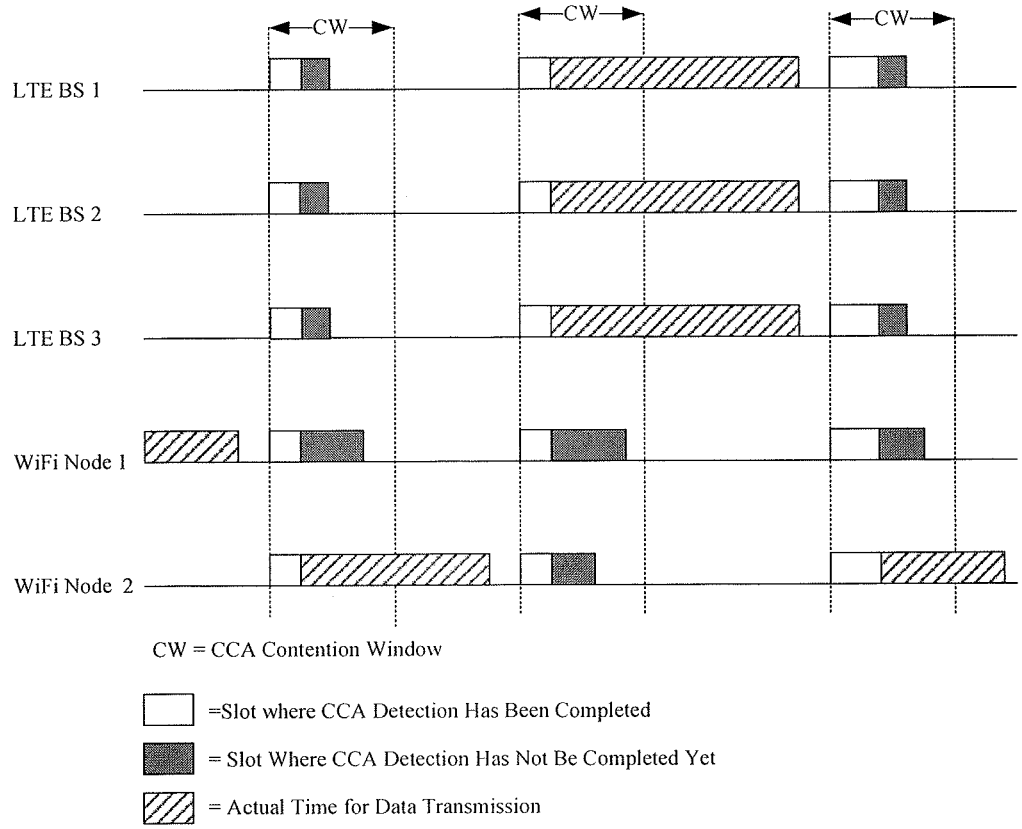
FIG. 6 is a schematic view showing an LBT scheme in the case that an identical required duration within which a CCA detection result indicates that a channel is clear is adopted by a plurality of devices according to one embodiment of the present disclosure.

The main control base station or main control node may issue in advance the generated T_CCA to the plurality of base stations of UEs. In the case that the plurality of base stations performs the resource contention on the carrier of the unlicensed frequency band in an LBT mode, the same T_CCA may be adopted by the plurality of base stations, as shown in FIG. 6. Through the LBT mode, it is able to prevent the occurrence of conflict between the LTE devices during the resource contention.

The main control base station or main control node may periodically generate the T_CCA, e.g., it may generate and issue the T_CCA every 20 ms.

The main control base station or main control node may issue in advance the T_CCA to the plurality of base stations or UEs. Here, for a time advance value for the transmission of the T_CCA, a transmission time delay of a backhaul for transmitting the T_CCA to the plurality of base stations or UEs needs to be taken into consideration, so as to ensure that all the base stations or UEs may receive the T_CCA during the resource contention.

In order to enable the T_CCA received by the plurality of base stations to be validated simultaneously, the main control base station or main control node may transmit the T_CCA carrying validation time information.

Fourth Embodiment: A Plurality of LTE Base Stations or UEs May Generate the Required Duration within which the CCA Detection Result Indicates that the Channel is Clear in Accordance with an Identical Rule For convenience, the duration within which the CCA detection result indicates that the channel is clear may be represented by T_CCA, and a rule (or formula) for generating the T_CCA may be predefined. The LTE base stations or UEs may generate the T_CCA in accordance with this rule. The T_CCA may be a specific value, a quantized value, or a random number N of the CCA detection time periods within which the CCA detection result indicates that the channel is clear in an LBT-extended CCA manner.

To be specific, the T_CCA may be generated in accordance with an absolute time, or in conjunction with a PLMN identifier of the operator. For example, the required duration within which the CCA detection result indicates that the channel is clear may be determined through one of the following formulae: T_CCA=mod(T/N) and T_CCA=mod(T*PLMN/N), where T_CCA represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs. T_CCA may be a value acquired by rounding down mod(T/N) or mod(T*PLMN/N).

In addition, the plurality of base stations or UEs may also generate the T_CCA in accordance with an identical rule/formula as well as an identical random seed. The random seed may be interactively transmitted among the base stations or UEs, or the main control node may notify the base stations or UEs of the random seed.

The UE may further generate the identical T_CCA in accordance with a predetermined rule and a specific parameter carried in a notification from the base station. The notification is used to indicate the UE to determine the required duration within which the CCA detection result indicates that the channel is clear in accordance with the specific parameter, e.g., the random seed, and the predetermined rule.

For example, the base station may carry the specific parameter (e.g., the random seed) in PDCCH signaling, and notify it to the UE. Then, the UE may generate the T_CCA in accordance with the specific parameter as well as the predetermined rule.

The T_CCA may be generated in accordance with the predetermined rule as well as the specific parameter (e.g., the random seed or in conjunction with the PLMN identifier) using one of the following formulae: T_CCA=mod(T_Seed/N) and T_CCA=mod(T_Seed*PLMN/N), where T_CCA represents the required duration within which the CCA detection result indicates that the channel is clear, T represents an absolute time period, N represents a maximum quantized value (a predetermined constant) of a predetermined duration within which the CCA detection result indicates that the channel is clear, PLMN represents a Public Land Mobile Network identifier of an operator to which the device belongs, and T_Seed represents the random seed. T_CCA may be a value acquired by rounding down mod(T_Seed/N) or mod mod(T_Seed*PLMN/N).

Fifth Embodiment: A Base Station May Notify a UE of the Required Duration within which the CCA Detection Result Indicates that the Channel is Clear For convenience, the duration within which the CCA detection result indicates that the channel is clear may be represented by T_CCA.

In the case of scheduling the uplink data transmission for a plurality of UEs, the base station may generate in advance the T_CCA. It may notify the UEs of the T_CCA to be used for the channel resource contention during the uplink data transmission, e.g., it may notify the UEs of the T_CCA carried in PDCCH signaling. Notification information in the PDCCH signaling may be a specific value, a quantized value, or a random number N of the CCA detection time periods within which the CCA detection result indicates that the channel is clear in an LBT-extended CCA manner.

In the case that it is necessary to schedule a plurality of uplink UEs within one uplink subframe, the base station may notify these uplink UEs of the same T_CCA, so as to prevent the channel resource contention among these uplink UEs. In order to prevent the channel resource contention among a plurality of UEs which belong to different adjacent base stations due to different T_CCAs, the base stations may notify the respective UEs of an identical T_CCA. At this time, the same T_CCA may be acquired by the base stations through the method mentioned in the third or fourth embodiment.

It should be appreciated that, validation time information about the required duration within which the CCA detection result indicates that the channel is clear may also be carried in the PDCCH signaling, and this validation time information may be a previous contention window within an uplink subframe (i.e., a previous CCA contention window within an uplink subframe in FIGS. 5a and 5b) for scheduling the PDCCH.

Sixth Embodiment: A Principle of Whether or not to Adopt, by the Device, the Method for Determining the Starting Time Point of the CCA Detection for Monitoring the Channel Before the Data Transmission and the Required Duration within which the CCA Detection Result Indicates that the Channel is Clear The device may determine whether or not to adopt the method for determining the starting time point of the CCA detection for monitoring the channel before the data transmission and the required duration within which the CCA detection result indicates that the channel is clear in accordance with a measurement result of neighboring cells.

For example, in the case that an unlicensed LTE device has detected any other neighboring LTE devices which belong to an operator identical to the unlicensed LTE device and power of signals for the other neighboring LTE devices is greater than a threshold Threshold1, it may adopt the method for determining the starting time point of the CCA detection for monitoring the channel before the data transmission and the required duration within which the CCA detection result indicates that the channel is clear.

In contrast, in the case that the unlicensed LTE device has detected the other neighboring LTE devices which belong to the operator identical to the unlicensed LTE device but the power of the signals for the other neighboring LTE devices is smaller than a threshold Threshold2 or the unlicensed LTE device fails to detect any neighboring LTE devices which belong to the operator identical to the unlicensed LTE device, the unlicensed LTE device may adopt the method for determining the starting time point of the CCA detection for monitoring the channel before the data transmission and the required duration within which the CCA detection result indicates that the channel is clear, or adopt a known LBT mode (where the unlicensed LTE device may independently select the starting time point of the CCA detection and independently generate, in accordance with the specification requirements, the required duration within which the CCA detection result indicates that the channel is clear before the data transmission).

In the case that the method for determining the starting time point of the CCA detection for monitoring the channel before the data transmission and the required duration within which the CCA detection result indicates that the channel is clear is adopted, for the downlink transmission, the base stations/cells which belong to an identical operator may adopt the same T_CCA, so they may be equivalent to an unlicensed device during the channel resource contention, as shown in FIG. 6. In this way, it is able to ensure that each of base station/cell may not detect signals from the other base stations/cells which belong to an identical operator in the case of monitoring the channel. Once a signal has been detected, it may determine that this signal comes from the other operator or unlicensed system. In the case that no signal has been detected, the base stations/cells which belong to an identical operator may perform the channel resource contention. As a result, it is able to prevent the channel resource contention among the base stations/cells which belong to an identical operator, thereby to achieve the co-frequency networking.

For the uplink transmission, a plurality of UEs which belong to an identical operator may adopt an identical T_CCA, so they may transmit the uplink data simultaneously within an identical subframe. In this way, it is able for the base station to schedule the plurality of UEs, so as to achieve uplink multi-user diversity gains or perform uplink MU-MIMO transmission, thereby to enable the LTE system to perform the data transmission on the unlicensed carrier in an efficient manner.

Figure 7:
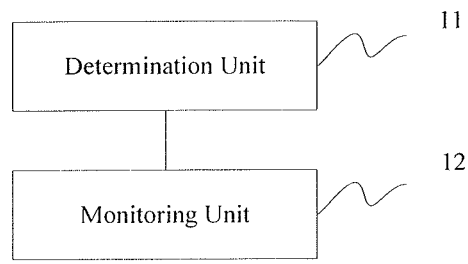
FIG. 7 is a schematic view showing a channel monitoring device according to one embodiment of the present disclosure.

As shown in FIG. 7, the present disclosure further provides in some embodiments a channel monitoring device, including: a determination unit 11 configured to determine a starting time point of CCA detection for monitoring a channel before data transmission and a required duration within which a CCA detection result indicates that the channel is clear; and a monitoring unit 12 configured to monitor the channel on an unlicensed frequency band in accordance with the starting time point and the required duration.

According to the channel monitoring device in the embodiments of the present disclosure, the channel monitoring device may monitor the channel on the unlicensed frequency band in accordance with the starting time point of the CCA detection for monitoring the channel before the data transmission and the required duration within which the CCA detection result indicates that the channel is clear, so as to achieve the channel resource contention for an LTE system in the case that it operates on the unlicensed carrier.

In a possible embodiment of the present disclosure, in the case of determining the starting time point of the CCA detection for monitoring the channel before the data transmission, the determination unit is further configured to determine the starting time point of the CCA detection for monitoring the channel before the data transmission in accordance with a maximum data transmission duration and a previous CCA contention window, a length of the previous CCA contention window being a previous required duration within which the CCA detection result indicates that the channel is clear; or determine the starting time point of the CCA detection for monitoring the channel before the data transmission in accordance with a definition about a starting time point of the CCA detection in a predetermined radio frame structure.

In a possible embodiment of the present disclosure, in the case of determining the required duration within which the CCA detection result indicates that the channel is clear, the determination unit is further configured to acquire the required duration within which the CCA detection result indicates that the channel is clear from a dedicated main control device; or determine the required duration within which the CCA detection result indicates that the channel is clear in accordance with a predetermined rule.

According to the channel monitoring device in the embodiments of the present disclosure, each of the adjacent devices may determine, in an identical manner, the starting time point of the CCA detection for monitoring the channel before the data transmission and the required duration within which the CCA detection result indicates that the channel is clear, so as to ensure that, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

In a possible embodiment of the present disclosure, in the case of determining the required duration within which the CCA detection result indicates that the channel is clear in accordance with the predetermined rule, the determination unit is further configured to determine the required duration within which the CCA detection result indicates that the channel is clear through one of the following formulae: T_CCA=mod(T/N) and T_CCA=mod(T*PLMN/N), where T_CCA represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

In a possible embodiment of the present disclosure, the determination unit is further configured to, prior to determining the starting time point of the CCA detection for monitoring the channel before the data transmission and the required duration within which the CCA detection result indicates that the channel is clear, measure a signal for an adjacent device. In the case of determining the starting time point of the CCA detection for monitoring the channel before the data transmission and the required duration within which the CCA detection result indicates that the channel is clear, the determination unit is further configured to determine the starting time point of the CCA detection for monitoring the channel before the data transmission and the required duration within which the CCA detection result indicates that the channel is clear in the case that a measurement result acquired through measuring the signal for the adjacent device meets a predetermined condition.

In a possible embodiment of the present disclosure, in the case of measuring the signal for the adjacent device, the determination unit is further configured to measure power of the signal for the adjacent device. In the case of determining the starting time point of the CCA detection for monitoring the channel before the data transmission and the required duration within which the CCA detection result indicates that the channel is clear in the case that the measurement result acquired through measuring the signal for the adjacent device meets the predetermined condition, the determination unit is further configured to determine the starting time point of the CCA detection for monitoring the channel before the data transmission and the required duration within which the CCA detection result indicates that the channel is clear in the case that the power of the signal for the adjacent device is greater than a predetermined threshold.

In a possible embodiment of the present disclosure, the channel monitoring device is a base station or a UE.

In a possible embodiment of the present disclosure, in the case that the channel monitoring device is a base station, the determination unit is further configured to transmit a notification carrying the required duration within which the CCA detection result indicates that the channel is clear to a UE.

In a possible embodiment of the present disclosure, the determination unit is further configured to transmit the notification to the UE through PDCCH signaling.

In a possible embodiment of the present disclosure, in the case that the channel monitoring device is a base station, the determination unit is further configured to transmit a notification carrying a specific parameter to a UE, the notification being used to indicate the UE to determine the required duration within which the CCA detection result indicate that the channel is clear in accordance with the specific parameter and the predetermined rule.

In a possible embodiment of the present disclosure, the notification further carries validation time information about the required duration within which the CCA detection result indicates that the channel is clear.

In a possible embodiment of the present disclosure, in the case that the channel monitoring device is a UE and the determination unit determines the required duration within which the CCA detection result indicates that the channel is clear, the determination unit is further configured to receive a notification from a base station, so as to acquire the required duration within which the CCA detection result indicates that the channel is clear carried in the notification.

In a possible embodiment of the present disclosure, the determination unit is further configured to receive the notification from the base station through PDCCH signaling.

In a possible embodiment of the present disclosure, in the case that the channel monitoring device is a UE and the determination unit determines the required duration within which the CCA detection result indicates that the channel is clear, the determination unit is further configured to: receive a notification from a base station so as to acquire a specific parameter carried in the notification; and determine the required duration within which the CCA detection result indicates that the channel is clear in accordance with the specific parameter and the predetermined rule.

In a possible embodiment of the present disclosure, the determination unit is further configured to acquire validation time information about the required duration within which the CCA detection result indicates that the channel is clear carried in the notification. The monitoring unit is further configured to monitor the channel on the unlicensed frequency band in accordance with the starting time point, the required duration and the validation time information.

The above-mentioned units may be implemented by such entities as processors.

Figure 8:
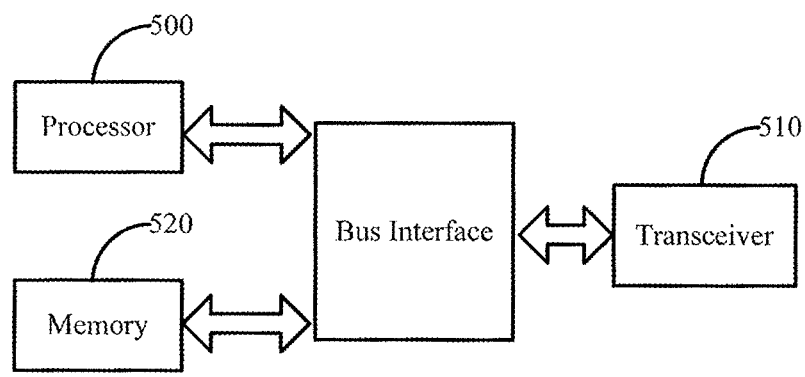
FIG. 8 is another schematic view showing the channel monitoring device according to one embodiment of the present disclosure.

As shown in FIG. 8, in the case that the channel monitoring device is a network side device, e.g., a base station, the network side device may include a processor 500, a transceiver 510 and a memory 520. The processor 500 is configured to read a program stored in the memory 520, so as to: determine a starting time point of CCA detection for monitoring a channel before data transmission and a required duration within which a CCA detection result indicates that the channel is clear; and monitor the channel on an unlicensed frequency band in accordance with the starting time point and the required duration. The transceiver 510 is configured to receive and transmit relevant data under the control of the processor 500.

According to the network side device in the embodiments of the present disclosure, the channel monitoring device may monitor the channel on the unlicensed frequency band in accordance with the starting time point of the CCA detection for monitoring the channel before the data transmission and the required duration within which the CCA detection result indicates that the channel is clear, so as to achieve the channel resource contention for an LTE system in the case that it operates on the unlicensed carrier.

In a possible embodiment of the present disclosure, in the case of determining the starting time point of the CCA detection for monitoring the channel before the data transmission, the processor 500 is further configured to determine the starting time point of the CCA detection for monitoring the channel before the data transmission in accordance with a maximum data transmission duration and a previous CCA contention window, a length of the previous CCA contention window being a previous required duration within which the CCA detection result indicates that the channel is clear; or determine the starting time point of the CCA detection for monitoring the channel before the data transmission in accordance with a definition about a starting time point of the CCA detection in a predetermined radio frame structure.

In a possible embodiment of the present disclosure, in the case of determining the required duration within which the CCA detection result indicates that the channel is clear, the processor 500 is further configured to acquire the required duration within which the CCA detection result indicates that the channel is clear from a dedicated main control device; or determine the required duration within which the CCA detection result indicates that the channel is clear in accordance with a predetermined rule.

According to the network side device in the embodiments of the present disclosure, each of the adjacent devices may determine, in an identical manner, the starting time point of the CCA detection for monitoring the channel before the data transmission and the required duration within which the CCA detection result indicates that the channel is clear, so as to ensure that, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

In a possible embodiment of the present disclosure, in the case of determining the required duration within which the CCA detection result indicates that the channel is clear in accordance with the predetermined rule, the processor 500 is further configured to determine the required duration within which the CCA detection result indicates that the channel is clear through one of the following formulae: T_CCA=mod(T/N) and T_CCA=mod(T*PLMN/N), where T_CCA represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

In a possible embodiment of the present disclosure, the processor 500 is further configured to, prior to determining the starting time point of the CCA detection for monitoring the channel before the data transmission and the required duration within which the CCA detection result indicates that the channel is clear, measure a signal for an adjacent device. In the case of determining the starting time point of the CCA detection for monitoring the channel before the data transmission and the required duration within which the CCA detection result indicates that the channel is clear, the processor 500 is further configured to determine the starting time point of the CCA detection for monitoring the channel before the data transmission and the required duration within which the CCA detection result indicates that the channel is clear in the case that a measurement result acquired through measuring the signal for the adjacent device meets a predetermined condition.

In a possible embodiment of the present disclosure, in the case of measuring the signal for the adjacent device, the processor 500 is further configured to measure power of the signal for the adjacent device. In the case of determining the starting time point of the CCA detection for monitoring the channel before the data transmission and the required duration within which the CCA detection result indicates that the channel is clear in the case that the measurement result acquired through measuring the signal for the adjacent device meets the predetermined condition, the processor 500 is further configured to determine the starting time point of the CCA detection for monitoring the channel before the data transmission and the required duration within which the CCA detection result indicates that the channel is clear in the case that the power of the signal for the adjacent device is greater than a predetermined threshold.

In a possible embodiment of the present disclosure, the processor 500 is further configured to transmit a notification carrying the required duration within which the CCA detection result indicates that the channel is clear to a UE.

In a possible embodiment of the present disclosure, the processor 500 is further configured to transmit the notification to the UE through PDCCH signaling.

In a possible embodiment of the present disclosure, the processor 500 is further configured to transmit a notification carrying a specific parameter to a UE, the notification being used to indicate the UE to determine the required duration within which the CCA detection result indicate that the channel is clear in accordance with the specific parameter and the predetermined rule.

In a possible embodiment of the present disclosure, the notification further carries validation time information about the required duration within which the CCA detection result indicates that the channel is clear.

In FIG. 5, bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. Bus interfaces are provided, and the transceiver 510 may consist of a plurality of elements, i.e., a transmitter and a receiver for communication with any other devices over a transmission medium. The processor 500 may take charge of managing the bus architecture as well as general processings. The memory 520 may store data desired for the operation of the processor 500.

Figure 9:
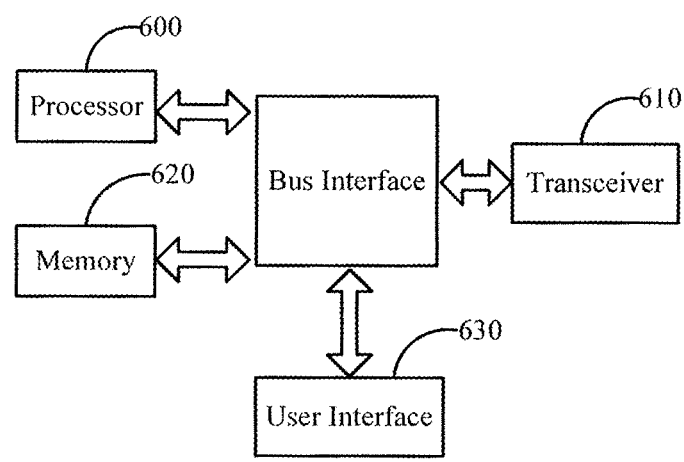
FIG. 9 is yet another schematic view showing the channel monitoring device according to one embodiment of the present disclosure.

As shown in FIG. 9, in the case that the channel monitoring device is a terminal side device, e.g., a UE, the terminal side device may include a processor 600, a transceiver 610 and a memory 620. The processor 600 is configured to read a program stored in the memory 620, so as to: determine a starting time point of CCA detection for monitoring a channel before data transmission and a required duration within which a CCA detection result indicates that the channel is clear; and monitor the channel on an unlicensed frequency band in accordance with the starting time point and the required duration. The transceiver 610 is configured to receive and transmit relevant data under the control of the processor 600.

According to the terminal side device in the embodiments of the present disclosure, the channel monitoring device may monitor the channel on the unlicensed frequency band in accordance with the starting time point of the CCA detection for monitoring the channel before the data transmission and the required duration within which the CCA detection result indicates that the channel is clear, so as to achieve the channel resource contention for an LTE system in the case that it operates on the unlicensed carrier.

In a possible embodiment of the present disclosure, in the case of determining the starting time point of the CCA detection for monitoring the channel before the data transmission, the processor 600 is further configured to determine the starting time point of the CCA detection for monitoring the channel before the data transmission in accordance with a maximum data transmission duration and a previous CCA contention window, a length of the previous CCA contention window being a previous required duration within which the CCA detection result indicates that the channel is clear; or determine the starting time point of the CCA detection for monitoring the channel before the data transmission in accordance with a definition about a starting time point of the CCA detection in a predetermined radio frame structure.

In a possible embodiment of the present disclosure, in the case of determining the required duration within which the CCA detection result indicates that the channel is clear, the processor 600 is further configured to acquire the required duration within which the CCA detection result indicates that the channel is clear from a dedicated main control device; or determine the required duration within which the CCA detection result indicates that the channel is clear in accordance with a predetermined rule.

According to the terminal side device in the embodiments of the present disclosure, each of the adjacent devices may determine, in an identical manner, the starting time point of the CCA detection for monitoring the channel before the data transmission and the required duration within which the CCA detection result indicates that the channel is clear, so as to ensure that, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

In a possible embodiment of the present disclosure, in the case of determining the required duration within which the CCA detection result indicates that the channel is clear in accordance with the predetermined rule, the processor 600 is further configured to determine the required duration within which the CCA detection result indicates that the channel is clear through one of the following formulae: T_CCA=mod (T/N) and T_CCA=mod(T*PLMN/N), where T_CCA represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

In a possible embodiment of the present disclosure, the processor 600 is further configured to, prior to determining the starting time point of the CCA detection for monitoring the channel before the data transmission and the required duration within which the CCA detection result indicates that the channel is clear, measure a signal for an adjacent device. In the case of determining the starting time point of the CCA detection for monitoring the channel before the data transmission and the required duration within which the CCA detection result indicates that the channel is clear, the processor 600 is further configured to determine the starting time point of the CCA detection for monitoring the channel before the data transmission and the required duration within which the CCA detection result indicates that the channel is clear in the case that a measurement result acquired through measuring the signal for the adjacent device meets a predetermined condition.

In a possible embodiment of the present disclosure, in the case of measuring the signal for the adjacent device, the processor 600 is further configured to measure power of the signal for the adjacent device. In the case of determining the starting time point of the CCA detection for monitoring the channel before the data transmission and the required duration within which the CCA detection result indicates that the channel is clear in the case that the measurement result acquired through measuring the signal for the adjacent device meets the predetermined condition, the processor 600 is further configured to determine the starting time point of the CCA detection for monitoring the channel before the data transmission and the required duration within which the CCA detection result indicates that the channel is clear in the case that the power of the signal for the adjacent device is greater than a predetermined threshold.

In a possible embodiment of the present disclosure, in the case of determining the required duration within which the CCA detection result indicates that the channel is clear, the processor 600 is further configured to receive a notification from a base station, so as to acquire the required duration within which the CCA detection result indicates that the channel is clear carried in the notification.

In a possible embodiment of the present disclosure, the processor 600 is further configured to receive the notification from the base station through PDCCH signaling.

In a possible embodiment of the present disclosure, ill the case of determining the required duration within which the CCA detection result indicates that the channel is clear, the processor 600 is further configured to: receive a notification from a base station so as to acquire a specific parameter carried in the notification; and determine the required duration within which the CCA detection result indicates that the channel is clear in accordance with the specific parameter and the predetermined rule.

In a possible embodiment of the present disclosure, the processor 600 is further configured to acquire validation time information about the required duration within which the CCA detection result indicates that the channel is clear carried in the notification. In the case of monitoring the channel on the unlicensed frequency band in accordance with the starting time point and the required duration, the processor 600 is further configured to monitor the channel on the unlicensed frequency band in accordance with the starting time point, the required duration and the validation time information.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. Bus interfaces are provided, and the transceiver 610 may consist of a plurality of elements, i.e., a transmitter and a receiver for communication with any other devices over a transmission medium. With respect to different UEs, a user interface 630 may also be provided for devices which are to be arranged inside or outside the UE, and these devices may include but not limited to a keypad, a display, a speaker, a microphone and a joystick. The processor 600 may take charge of managing the bus architecture as well as general processings. The memory 620 may store data desired for the operation of the processor 600.

It should be appreciated that, the technical solution in the embodiments of the present disclosure may be applied to the LTE device operating on the unlicensed frequency band, or any other unlicensed system.

In a word, according to the embodiments of the present disclosure, the LTE devices may generate the CCA detection time during the channel resource contention in an LBT mode in the case that they operate on the unlicensed frequency band, so as to ensure that, on the carrier of the unlicensed frequency band, the devices may perform the channel resource contention within an identical resource contention window using the same duration within which the CCA detection result indicates that the channel is clear. For downlink transmission, an identical CCA detection time period may be adopted by a plurality of base stations belonging to an identical operator, and these base stations may be equivalent to one unlicensed device during the resource contention, so it is able to ensure the co-frequency networking for the LTE system on the unlicensed frequency band. For uplink transmission, it is able to ensure that the LTE system may support scheduling the uplink transmission for a plurality of UEs simultaneously or support the MU-MIMO technology, thereby to improve the system performance.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A channel monitoring method, comprising steps of:
   determining, by a device, a starting time point of Clear Channel Assessment (CCA) detection for monitoring a channel before data transmission and a required duration within which a CCA detection result indicates that the channel is clear in a manner identical to all other devices belonging to an operator that the device belongs to; and
   monitoring, by the device, the channel on an unlicensed frequency band in accordance with the starting time point and the required duration,
   wherein the step of determining, by the device, the required duration within which the CCA detection result indicates that the channel is clear comprises: determining, by the device, the required duration within which the CCA detection result indicates that the channel is clear in accordance with a predetermined rule,
   wherein the step of determining, by the device, the required duration within which the CCA detection result indicates that the channel is clear in accordance with the predetermined rule comprises determining, by the device, the required duration within which the CCA detection result indicates that the channel is clear through one of the following formulae: $T\_CCA=\mathrm{mod}(T/N)$ and $T\_CCA=\mathrm{mod}(T*PLMN/N)$, where $T\_CCA$ represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

2. The channel monitoring method according to claim 1, wherein the step of determining, by the device, the starting time point of the CCA detection for monitoring the channel before the data transmission comprises:
   determining, by the device, the starting time point of the CCA detection for monitoring the channel before the data transmission in accordance with a maximum data transmission duration and a previous CCA contention window, a length of the previous CCA contention window being a previous required duration within which the CCA detection result indicates that the channel is clear.

3. The channel monitoring method according to claim 1, wherein prior to determining, by the device, the starting time point of the CCA detection for monitoring the channel before the data transmission and the required duration within which the CCA detection result indicates that the channel is clear, the channel monitoring method further comprises measuring, by the device, a signal for an adjacent device, and
   the step of determining, by the device, the starting time point of the CCA detection for monitoring the channel before the data transmission and the required duration within which the CCA detection result indicates that the channel is clear comprises determining, by the device, the starting time point of the CCA detection for monitoring the channel before the data transmission and the required duration within which the CCA detection result indicates that the channel is clear in the case that a measurement result acquired through measuring the signal for the adjacent device meets a predetermined condition.

4. The channel monitoring method according to claim 3, wherein the step of measuring, by the device, the signal for the adjacent device comprises measuring, by the device, power of the signal for the adjacent device, and the step of determining, by the device, the starting time point of the CCA detection for monitoring the channel before the data transmission and the required duration within which the CCA detection result indicates that the channel is clear in the case that the measurement result acquired through measuring the signal for the adjacent device meets the predetermined condition comprises determining, by the device, the starting time point of the CCA detection for monitoring the channel before the data transmission and the required duration within which the CCA detection result indicates that the channel is clear in the case that the power of the signal for the adjacent device is greater than a predetermined threshold.

5. The channel monitoring method according to claim 1, wherein the device is a base station or a User Equipment (UE).

6. The channel monitoring method according to claim 5, wherein in the case that the device is a base station, the channel monitoring method further comprises transmitting, by the base station, a notification carrying the required duration within which the CCA detection result indicates that the channel is clear to a UE.

7. The channel monitoring method according to claim 6, wherein the step of transmitting, by the base station, the notification to the UE comprises transmitting, by the base station, the notification to the UE through Physical Downlink Control Channel (PDCCH) signaling.

8. The channel monitoring method according to claim 6, wherein the notification further carries validation time information about the required duration within which the CCA detection result indicates that the channel is clear.

9. The channel monitoring method according to claim 5, wherein in the case that the device is a base station, the channel monitoring method further comprises transmitting, by the base station, a notification carrying a specific parameter to a UE, the notification being used to indicate the UE to determine the required duration within which the CCA detection result indicate that the channel is clear in accordance with the specific parameter and a predetermined rule.

10. The channel monitoring method according to claim 5, wherein in the case that the device is a UE, the step of determining, by the device, the required duration within which the CCA detection result indicates that the channel is clear comprises receiving, by the UE, a notification from a base station, to acquire the required duration within which the CCA detection result indicates that the channel is clear carried in the notification.

11. The channel monitoring method according to claim 10, wherein the step of receiving, by the UE, the notification from the base station comprises receiving, by the UE, the notification from the base station through PDCCH signaling.

12. The channel monitoring method according to claim 10, further comprising acquiring, by the UE, validation time information about the required duration within which the CCA detection result indicates that the channel is clear carried in the notification, wherein the step of monitoring, by the device, the channel on the unlicensed frequency band in accordance with the starting time point and the required duration comprises monitoring, by the UE, the channel on the unlicensed frequency band in accordance with the starting time point, the required duration and the validation time information.

13. The channel monitoring method according to claim 5, wherein in the case that the device is a UE, the step of determining, by the device, the required duration within which the CCA detection result indicates that the channel is clear comprises: receiving, by the UE, a notification from a base station to acquire a specific parameter carried in the notification; and determining, by the UE, the required duration within which the CCA detection result indicates that the channel is clear in accordance with the specific parameter and a predetermined rule.

14. The channel monitoring method according to claim 1, wherein all devices belonging to the operator adopts an identical starting time point of CCA detection.

15. The channel monitoring method according to claim 1, wherein all devices belonging to the operator adopts an identical required duration within which the CCA detection result indicates that the channel is clear.

16. A network side device, comprising a processor and a memory, wherein the processor is configured to read a program stored in the memory, to: determine a starting time point of Clear Channel Assessment (CCA) detection for monitoring a channel before data transmission and a required duration within which a CCA detection result indicates that the channel is clear, in a manner identical to all other devices belonging to an operator that the network side device belongs to; and monitor the channel on an unlicensed frequency band in accordance with the starting time point and the required duration, wherein the processor is further configured to determine the required duration within which the detection result indicates that the channel is clear through one of the following formulae: $T\_CCA=mod(T/N)$ and $T\_CCA=mod(T*PLMN/N)$, where $T\_CCA$ represents the required duration within which the CCA detection result indicates that the channel is clear, T represents an absolute time period N represents a maximum quantized value of a predetermined duration within which the CCA detection result indicates that the channel is clear, and PLMN represents a Public Land Mobile Network identifier of an operator to which the device belongs.

17. A terminal side device, comprising a processor and a memory, wherein the processor is configured to read a program stored in the memory, to: determine a starting time point of Clear Channel Assessment (CCA) detection for monitoring a channel before data transmission and a required duration within which a CCA detection result indicates that the channel is clear, in a manner identical to all other devices belonging to an operator that the terminal side device belongs to; and monitor the channel on an unlicensed frequency band in accordance with the starting time point and the required duration, wherein the processor is further configured to determine the required duration within which the CCA detection result indicates that the channel is clear through one of the following formulae: $T\_CCA=mod(T/N)$ and $T\_CCA=mod(T*PLMN/N)$, where $T\_CCA$ represents the required duration within which the CCA detection result indicates that the channel is clear, T represents an absolute time period, N represents a maximum quantized value of a predetermined duration within which the CCA detection result indicates that the channel is clear, and PLMN represents a Public Land Mobile Network identifier of an operator to which the device belongs.

* * * * *